(12) United States Patent
Bonnin

(10) Patent No.: US 9,303,199 B2
(45) Date of Patent: Apr. 5, 2016

(54) ANTIFREEZE COOLING LIQUID WITH HIGH HEAT CARRYING CAPACITY

(71) Applicant: BULL SAS, Les Clayes-Sous-Bois (FR)

(72) Inventor: Jean-Christophe Bonnin, Rambouillet (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 14/189,716

(22) Filed: Feb. 25, 2014

(65) Prior Publication Data

US 2014/0239222 A1     Aug. 28, 2014

(30) Foreign Application Priority Data

Feb. 26, 2013   (FR) ..................................... 13 51696

(51) Int. Cl.
| | |
|---|---|
| *C09K 5/00* | (2006.01) |
| *C09K 5/10* | (2006.01) |
| *C09K 5/20* | (2006.01) |
| *C23F 11/14* | (2006.01) |
| *C23F 11/10* | (2006.01) |

(52) U.S. Cl.
CPC ... *C09K 5/10* (2013.01); *C09K 5/20* (2013.01); *C23F 11/10* (2013.01); *C23F 11/149* (2013.01)

(58) Field of Classification Search
CPC ...................................................... C09K 5/066
See application file for complete search history.

(56) References Cited

U.S. PATENT DOCUMENTS 7,854,253 B2 * 12/2010 Woyciesjes et al. ..... 165/104.19

FOREIGN PATENT DOCUMENTS

| | | |
|---|---|---|
| CN | 101 319 134 | 12/2008 |
| CN | 102 786 915 | 11/2012 |
| EP | 0 971 013 | 1/2000 |
| EP | 1 416 563 | 5/2004 |

OTHER PUBLICATIONS

Search Report as issued for French Patent Application No. 1351696, dated Dec. 20, 2013.

* cited by examiner

*Primary Examiner* — Necholus Ogden, Jr.

(74) *Attorney, Agent, or Firm* — Pillsbury Winthrop Shaw Pittman LLP

(57) ABSTRACT

An antifreeze cooling liquid with a high heat carrying capacity is composed of: at least 33% of monopropylene glycol; at least 2% of a triazole, not more than 1% of biocides, the addition of water to make 100%.

11 Claims, No Drawings

ANTIFREEZE COOLING LIQUID WITH HIGH HEAT CARRYING CAPACITY

CROSS REFERENCES TO RELATED APPLICATIONS

This application claims priority to French Patent Application No. 1351696, filed Feb. 26, 2013, the entire content of which is incorporated herein by reference in its entirety.

FIELD

The invention relates to cooling and more particularly cooling of electronic components. Even more particularly, the invention relates to cooling by a liquid coolant in a closed circuit with no phase change.

Even more particularly, the invention relates to cooling of electronic components in environments in which there are high voltages and in which there are special metals such as gold or silver. These metals are mentioned non-limitatively.

High voltages in the context of this application refer to voltages of the order of about fifty volts. In particular, this relates to intensive computer centre environments and more generally to server clusters and computer centres.

BACKGROUND

In the state of the art, two types of closed cooling circuits can be used for all fields combined:
  with phase change:
    sealed for life with no compressor, such as heat pipes: not concerned by the invention
    removable, with compressor, such as air conditioning and heat pumps.
  without phase change: a single pump is sufficient to route the liquid and heat that it carries between the heat source and the location at which heat is dissipated, usually through heat exchangers.
  Three families of antifreeze liquid are used in circuits without phase change:
    brines (aqueous solution of various salts): brines have the required characteristics apart from the possibility that they can cause dangerous reactions when they are in contact with a current at a high voltage of 54 volts; after water evaporates, the salts are conducting and cause exothermal reactions with flames and splashes.
    non-aqueous solutions: may have all the required properties, particularly in that they are dielectric and therefore they do not cause any dangerous reactions when in contact with high voltage but their heat carrying capacity is insufficient and the cooling system must be much larger and less economic.
    aqueous solutions of glycols and similar products:
      MPG monopropylene glycol: causes a dangerous exothermal reaction when it is in contact with a gold-plated or silver-plated conductor and through which a current passes at high voltage: electrolysis of glycol causes flames and there will be no overcurrent and therefore the electrical circuit will not trip; the risk of fire is thus high;
      MEG: mono-ethylene glycol: dangerous for humans:
      PEG: poly-ethylene glycol: behaves like MPG:
      glycerine or glycerol: not frequently used, behaves like MPG
  In summary, there are several non-aqueous solutions that exist but none can give all the required characteristics. Globally, they have a low heat carrying capacity and are expensive. This makes the cooling system for electronic boards, electrical components, and machines close to electrical currents larger and more expensive.

The development of this type of liquid takes a long time. The validation of compatibilities with materials is tedious.

SUMMARY

An aspect of the invention relates to a cooling liquid with the following characteristics:
  aqueous solution with a high heat carrying capacity,
  that does not freeze at −15° C.
  low viscosity and low density
  that can be used with no phase change in a closed circuit
  that does not cause corrosion to the following metals:
    gold,
    silver,
    copper
    steel
    aluminium
    stainless steel
    brass
    nickel
  that does not degrade the following materials:
    PTFE: Polytetrafluoroethylene
    EPDM: ethylene-propylene-diene monomer,
    NBR: butadiene-acrylonitrile,
    PU: polyurethane,
    POM: polyoxymethylene.
  not dangerous for humans or for the environment.
  The cooling liquid should also not provoke any dangerous reaction when it is in prolonged contact for at least 2 weeks with a conductor covered with gold or silver plating and through which an electric current of up to 54 volts passes.

All these characteristics make the liquid according to an embodiment of the invention suitable for use in computer centre environments, and inside computers themselves through closed liquid cooling circuits.

An aspect of the invention is aimed at overcoming all or some of the disadvantages of the state of the art identified above, and particularly at disclosing an arrangement for making a cooling liquid with a high heat carrying capacity, electrically neutral at high voltages, not noxious for humans, the environment in which it is used and the environment in general.

To achieve this, one aspect of the invention relates to an antifreeze cooling liquid with a high heat carrying capacity, the cooling liquid comprising:
  at least 33% of monopropylene glycol
  at least 2% of a triazole,
  not more than 1% of biocides,
  the addition of water to make 100%.

In an embodiment, the cooling liquid is composed of:
  at least 33% of monopropylene glycol
  at least 2% of a triazole,
  not more than 1% of biocides,
  the addition of water to make 100%.

In an embodiment, the cooling liquid consists essentially of the above components.

Apart from the main characteristics that have been mentioned in the previous section, the method/device according to an embodiment of the invention may have one or several additional characteristics among the following taken individually or in any technically possible combination:
  the cooling liquid is composed of:
  40% of monopropylene glycol,
  5% of a triazole,
  not more than 1% of biocides, the addition of water to make 100%

The triazole is a benzotriazole, the biocides are quaternary ammoniums, the water is pure water with low conductivity, the conductivity of pure water is less than or equal to 15 MicroSiemens/cm, benzotriazole acts as a corrosion inhibitor.

The percentage of each component is expressed in term of volume of the component relative to the total volume of the cooling liquid.

DETAILED DESCRIPTION

An embodiment of the invention consists of making a mix of the following components in suitable proportions:

MPG: monopropylene glycol

BZT: benzotriazole,

Biocides,

Pure water.

BZT is already present in cooling liquids inhibited against corrosion because it is known to act as a corrosion inhibitor of copper, but this is not only this aspect that is useful in an embodiment of the invention. BZT is also known as a flame retardant, but this is not this aspect that is concerned.

In appropriate proportions according to an embodiment the invention, it has been found that BZT inhibits the reaction between gold or silver on the wetted conductor and products originating from electrolysis of the aqueous solution of MPG. It is no longer dangerous for the environment and it is very stable. Furthermore, in proportions according to an embodiment of the invention, BZT inhibits the corrosion of at least copper, steel, aluminium, stainless steel, brass and nickel.

Although cooling liquids containing BZT do exist, the content of BZT is about 0.5%. This proportion was tested but led to a dangerous reaction in the presence of a 54 volt voltage; a fire can be started without causing an overcurrent and therefore without tripping protection of the electrical power supply circuit.

BZT-related characteristics of the cooling liquid according to an embodiment of the invention are obtained using a concentration of BZT equal to 2%.

The BZT content of 5% avoids the need for any other corrosion inhibitors because it inhibits corrosion of copper, steel, aluminium, stainless steel, brass and nickel, these metals being the most frequently found in electronic cooling circuits and in other domains.

This proportion of 5% is not natural. It is greater than the dilution threshold of BZT in water alone (2%). The presence of MPG at concentrations according to an embodiment of the invention enables this dilution at a high content. The final product is stable and does not precipitate. This effect is observed starting from a 33% concentration of MPG. The optimum with the other desired characteristics is achieved for a 40% concentration of MPG. The MPG also acts as antifreeze. Therefore the use of a mix of MPG and BZT at concentrations according to an embodiment of the invention can eliminate known disadvantages of MPG mentioned above in environments in which there are high voltages.

The use of pure water can reduce the conductivity of the liquid obtained. In an embodiment, water with an electric conductivity of not more than 15 MicroSiemens/cm is used.

Dosing of biocides is conventional. One, example is biocides in the quaternary ammoniums family. One or several of them are used. It will be appreciated that other biocides can be used.

Although the invention has been illustrated with a benzotriazole, a triazole in one of the following families could also be used instead, although the list is not exhaustive:

A bi-triazole,

An amino-triazole, or

Tolyltriazole.

One of the following in the benzotriazoles family is used, although this list is not exhaustive:

methyl-1H-benzotriazole, dimethyl-1H-benzotriazole, chloro-1H-benzotriazole, carboxybenzotriazole, etc.

The invention claimed is:

1. An antifreeze cooling liquid with high heat carrying capacity usable in environments in which there is gold or silver, the liquid consisting of:

about 40% of monopropylene glycol, about 5% of a triazole, not more than about 1% of biocides, the addition of water to make 100%.

2. The liquid according to claim 1, wherein the triazole is a benzotriazole.

3. The liquid according to claim 1, wherein the biocides are quaternary ammoniums.

4. The liquid according to claim 1, wherein the addition of water to make 100% is done with pure water with low conductivity.

5. The liquid according to claim 4, wherein the conductivity of pure water is less than or equal to 15 MicroSiemens/cm.

6. The liquid according to claim 1, wherein triazole acts as a corrosion inhibitor.

7. An antifreeze cooling liquid with high heat carrying capacity usable in environments in which there is gold or silver, the liquid consisting of:

at least 33% of monopropylene glycol at least 3% of a triazole, not more than 1% of biocides, the addition of water to make 100%.

8. The liquid according to claim 7, wherein the triazole is a benzotriazole and is in an amount of at least 4%.

9. The liquid according to claim 8, wherein the benzotriazole is in an amount of about 5%.

10. The liquid according to claim 7, wherein the conductivity of pure water is less than or equal to 15 MicroSiemens/cm.

11. The liquid according to claim 7, wherein the biocides are quaternary ammoniums.

* * * * *